US008242926B2

(12) United States Patent
Byers et al.

(10) Patent No.: US 8,242,926 B2
(45) Date of Patent: Aug. 14, 2012

(54) ENERGY-SAVING STATUS INDICATOR

(75) Inventors: Charles Calvin Byers, Wheaton, IL (US); Rudolph Benedict Klecka, Austin, TX (US); Freddy Alejandro Mercado, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 12/347,950

(22) Filed: Dec. 31, 2008

(65) Prior Publication Data
US 2010/0164736 A1 Jul. 1, 2010

(51) Int. Cl.
 *G08B 23/00* (2006.01)
(52) U.S. Cl. ............. 340/693.3; 340/7.32; 340/635
(58) Field of Classification Search .......... 340/500, 340/657, 538, 635, 641, 693.3, 7.32, 7.38, 340/333, 425.2, 815.45; 315/129, 287, 291
See application file for complete search history.

(56) References Cited

U.S. PATENT DOCUMENTS

| | | | |
|---|---|---|---|
| 5,938,772 A | 8/1999 | Welch | |
| 7,067,992 B2 | 6/2006 | Leong et al. | |
| 7,190,121 B2 * | 3/2007 | Rose et al. | 315/129 |
| 2008/0007418 A1 * | 1/2008 | Maki et al. | 340/686.6 |
| 2008/0197790 A1 * | 8/2008 | Mangiaracina et al. | 315/312 |
| 2008/0265685 A1 * | 10/2008 | Blair et al. | 307/141 |
| 2008/0290814 A1 * | 11/2008 | Leong et al. | 315/294 |

OTHER PUBLICATIONS

Klecka, Rudy, et al., "Energy Efficient Ethernet Beyond the PHY: Power Savings in Networked Systems", *IEEE 802.3 Energy Efficient Ethernet*, (May 2007), 12 pgs.

* cited by examiner

*Primary Examiner* — Brent Swarthout
(74) *Attorney, Agent, or Firm* — Schwegman, Lundberg & Woessner, P.A.

(57) ABSTRACT

The embodiments described herein present methods and apparatus for an energy-saving status indicator. A method includes receiving a configuration of a first power consumption state for a status indicator light in a network device. The method then activates the first power consumption state using the configuration. After detecting a condition, the method activates a second power consumption state for the status indicator light. The transition from the first power state to the second power state may be from a low power state to a normal operating state or from a normal operating state to a low power state in various embodiments. Other embodiments are described.

18 Claims, 5 Drawing Sheets

ENERGY-SAVING STATUS INDICATOR

FIELD

The present disclosure relates generally to power control in network appliances. In an example embodiment, the disclosure relates to an energy-saving status indicator.

BACKGROUND

High density routers and similar equipment often have dozens or hundreds of cables used to carry network traffic to other network devices. In some cases, each of the link cables is associated with one or more link status indicator lights. Such lights may be presented on the front face of the equipment, for example. The link status indicator lights may provide information regarding the link condition, such as "in service," "active," "busy," "error," or link speed, by using blink patterns or status indicator light color. Such link status indicator lights may be used, for example, by technicians when installing or troubleshooting, to determine the link status and ensure correct operation.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

Figure 1:
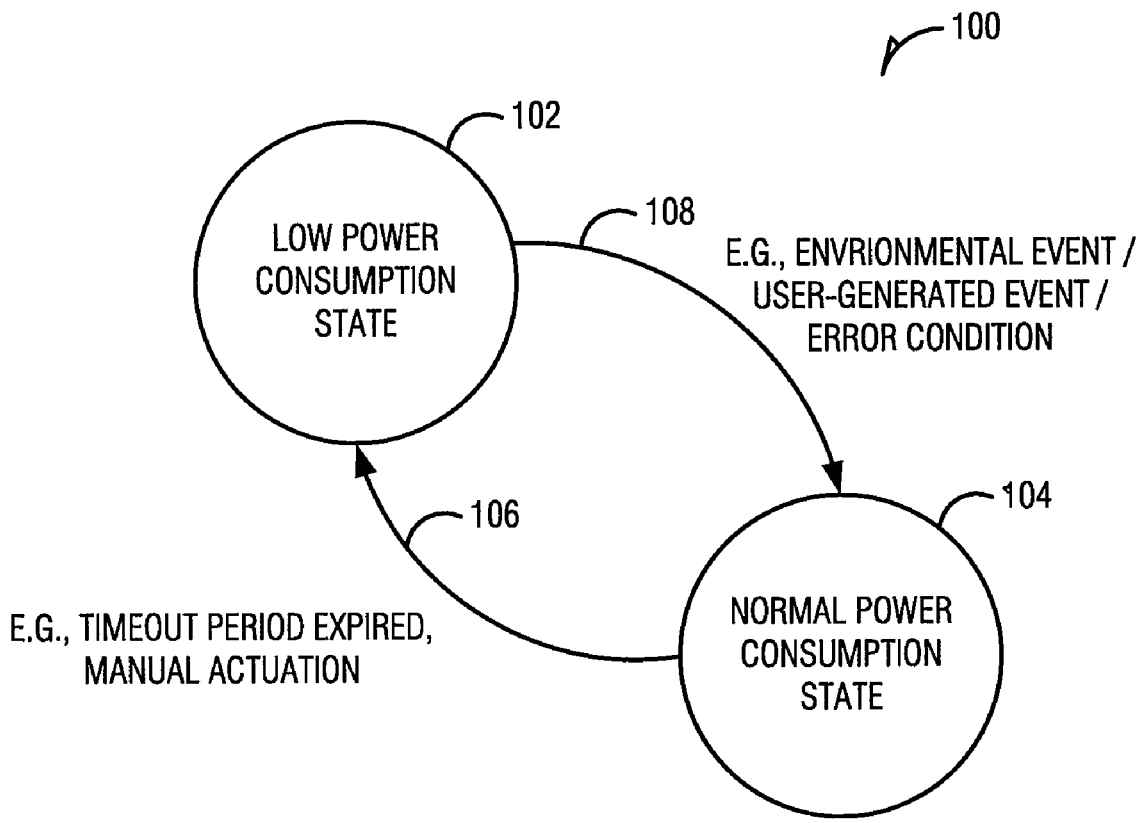
FIG. 1 is a state diagram illustrating LED operation in a network device, in accordance with an example embodiment.

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

In an example embodiment, a method for managing a power consumption state of a status indicator light in a network device, comprises using a first power consumption state of the status indicator light in the network device, detecting a condition, and activating a second power consumption state of the status indicator light in response to detecting the condition.

In a further example embodiment, the method may comprise receiving a configuration of the first power consumption state for the status indicator light in the network device and using the first power consumption state based on the configuration.

In an example embodiment, using the first power consumption state comprises determining a timeout period and activating the first power consumption state after the timeout period has expired.

In an example embodiment, detecting the condition comprises detecting a change in an environmental condition.

In an example embodiment, detecting the change in the environmental condition includes at least one of: a change in ambient lighting or a change in a time of day.

In an example embodiment, detecting the condition comprises detecting a presence of an operator.

In an example embodiment, detecting the presence of the operator uses at least one of: motion detection, door switch actuation, or an electrostatic discharge grounding connection detection.

In an example embodiment, detecting the condition comprises detecting an error condition and wherein activating the second power consumption state includes activating a normal power mode.

In an example embodiment, the first power consumption state includes a reduced power mode.

In an example embodiment, the reduced power mode includes at least one of: using a reduced number of status indicator lights, using no status indicator lights, or pulsing a status indicator light.

In an example embodiment, activating the second power consumption state comprises switching the status indicator light to an off state.

In an example embodiment, an apparatus for managing a power consumption state of a status indicator light in a network device, comprises the status light operating in a first power consumption state; means for detecting a condition; and a processor configured to activate a second power consumption state of the status indicator light in response to detecting the condition.

In an example embodiment, an apparatus comprises a processor, a status indicator light in communication with the processor, and a memory in communication with the processor, the memory comprising instructions executable by the processor, which when executed, the processor being operable to: receive a configuration of a first power consumption state for the status indicator light, activate the first power consumption state using the configuration, detect a condition; and activate a second power consumption state for the status indicator light in response to detecting the condition.

In a further example embodiment, the memory includes instructions executable by the processor, which when executed, the processor being operable to: determine a timeout period and activate the first power consumption state after the timeout period has expired.

In an example embodiment, the instructions used to detect the condition further comprise instructions executable by the processor, which when executed, the processor being operable to detect a change in an environmental condition.

In an example embodiment, the change in the environmental condition includes at least one of: a change in ambient lighting or a change in a time of day.

In an example embodiment, the instructions used to detect the condition further comprise instructions executable by the processor, which when executed, the processor being operable to detect a presence of an operator.

In an example embodiment, the instructions used to detect the presence of the operator uses at least one of: a motion detector, a door switch, or connection to an electrostatic discharge unit.

In an example embodiment, the instructions used to detect the condition further comprise instructions executable by the processor, which when executed, the processor being operable to detect an error condition and wherein the instructions used to activate the second power consumption state further comprise instructions executable by the processor, which when executed, the processor being operable to activate a normal power mode.

In an example embodiment, the first power consumption state includes a low power consumption state.

In an example embodiment, the low power consumption state includes at least one of: using a reduced number of status indicator lights, using no status indicator lights, or pulsing a status indicator light.

In an example embodiment, the pulsing the status indicator light includes configuring the status indicator light to pulse at a frequency that reduces the chances of causing photosensitive seizures.

The term "network devices" refers to a wide variety of network appliances ranging from less-complex devices, such as consumer-grade routers or hubs, to more-complex devices, such as commercial-grade routers or switches. In nearly all cases, these network devices include one or more status indicator lights. The status indicator lights may be in the form of solid-state lighting, such as light-emitting diodes (LEDs), organic light-emitting diodes (OLED) or polymer light-emitting diodes (PLED). Other types of lighting or lamps may be used, including but not limited to incandescent light bulbs, fluorescent lighting, high-intensity discharge lighting, or plasma lamps. In addition, status indicator lights may include a display, such as a LED display or liquid crystal display (LCD).

The status indicator lights are used to provide a status of activity, operation, or other states or conditions of the network device. For example, most Internet Protocol (IP) routers supply at least two status light-emitting diodes (LEDs) per link. One LED often is used to indicate link status and another LED is used to provide an indication of link activity. These indicator LEDs are active even when there is no human operator around to see them. A surprising amount of energy is wasted in driving these unobserved LEDs.

In the case of LEDs, status indicator LEDs typically utilize a drive signal of approximately 15 mA at 3.3 VDC to illuminate them. This uses approximately 50 mW of energy per LED, which equates to up to 100 mW per link. Because the indicators are not operating at 100% duty cycle, for example an activity LED may blink to indicate network traffic activity, an average of 50 mW per link average energy consumption is assumed for this discussion. High-density router cards, also referred to as "line cards," may support forty-eight or more links, which when considered in addition to the other board-level status indicators for power, CPU status, fault status, and the like, may account for a total indicator energy consumption of approximately 2.5 W per high-density router card. A medium-sized workgroup router may include eight or more high-density router cards, for a total energy consumption of 20 W or more per router. After accounting for the additional energy utilized to cool the machine because of the LED status indicators, the cost of powering such lights and auxiliary services (e.g., cooling) is substantial, especially when considering the fact that nobody is observing them for a vast majority of the time. The problem is even more significant when considering that tens, hundreds, or even thousands of routers may be used in a single enterprise-wide network.

While many of the example embodiments illustrated in this document refer to commercial-grade network devices, such as those that are constructed using a chassis in combination with one or more line cards, it is understood that the mechanisms and apparatus described can be applied to consumer-grade devices and other types of network devices with status indicator lights.

EXAMPLE EMBODIMENTS

The example embodiments described herein present methods and apparatus for implementing energy-saving indicator lights. One technique of providing energy-saving indicator lights includes configuring the indicator lights to be active using a configuration mode. For example, one configuration mode uses a single indicator light to indicate a general system status, thereby saving power by not illuminating additional indicator lights. In such a mode, when a condition occurs, such as an error, additional indicator lights may be illuminated to assist in troubleshooting and maintenance.

Another mode may use a blinking pattern to conserve power. For example, during normal operation, a link carrier detect indicator light may blink at 1 Hz (one short duty cycle pulse every second). The blink frequency may be configurable. In addition, the blink frequency may be constrained to avoid inducing medical conditions, such as photosensitive seizures in people with certain epileptic conditions.

Another mode may disable all status indicator lights in a network device until a condition is detected. For example, when an error condition is detected, one or more status indicator lights may be enabled to present an operational status to a technician and assist in determining the cause of the error. The disabling and re-enabling may be configurable, for example, using administrative control software. As an example, the indicator light may be disabled after a period of inactivity or use, such as a timeout period. The timeout period may be configurable. Re-enabling the status indicator light may occur after one or more conditions or triggering events are detected. Triggering events may include events, such as, for example, detecting a person in close proximity to the equipment associated with the status indicator light; detecting an access event from a computer or other device; or detecting an environmental condition or event, such as the activation of room lights, a change in ambient temperature, or even a motion detector detecting activity in an area. While examples are provided that illustrate various mechanisms and methods to manage power consumption of status indicator lights, it is understood that other mechanisms and methods may be used and still be included in the scope of this disclosure. Also, it is understood that two or more mechanisms may be combined to provide additional configurations.

FIG. 1 is a state diagram 100 illustrating LED operation in a network device, in accordance with an example embodiment. The state diagram 100 includes a low power consumption state 102 and a normal power consumption state 104. A low power consumption state includes a reduced power state of a status indicator light when compared to a normal power consumption state. In an example embodiment, a low power consumption state is a no-power consumption state. A normal power consumption state includes a power state of a status indicator light during normal operation of an associated network device. The normal power state does not necessarily mean "full on" power, but rather whatever power state that is being used for a status indicator light that coincides with normal operation of the associated network device. For example, the normal power consumption 104 state may be a reduced power state and a transition 106 to the low power consumption state 102 may reduce the power to a status indicator light to a "no-power" state—turning the status light indicator off.

In embodiments, various methods and mechanisms may be used to enter the low power consumption state 102. As an example, a user (e.g., system operator) may manually cause a network device to enter the low power consumption state 102. The user may control the power setting using a software interface. As another example, the user may manually cause the network device to enter the low power consumption state 102 using a hardware interface, such as a button, switch, or other control on a network device. In an example embodiment, the user may use a configurable keyboard command to enter the low power state 102. As another example, the low power consumption state 102 may be entered automatically, such as, for example, after a timeout period. As illustrated, the low power consumption state 102 may be entered from the normal power consumption state 104 by way of a first transition vector 106.

In addition, the low power consumption state 102 may be entered when the network device is powered on. For example, the low power consumption state 102 may be defined as the default state used on power up. For example, the status indicator lights may operate in the low power consumption state 102 after a system startup, but then after detecting the presence of an operator, the status indicator lights may transition 108 to the normal power consumption state 104. After a timeout period, such as ten minutes of inactivity, the status indicator lights may transition 106 back to the first power consumption state 102 to further conserve power when the operator is assumed to be absent.

From the low power consumption state 102, the network device may be configured to detect an event and in response, transition 108 to the normal power consumption state 104. The event may be an environmental event, a user-generated event, a system-generated event, or other types of events, such as an error. Environmental events may include events such as ambient or room lighting activation, ambient or room temperature changes or settings, or a time of day. For example, when room lights are inactive, a photocell may be used to trigger a low power consumption state 102 based on an assumption that the inactive room lights indicate that there are few or no people in the room. As such, presenting the LED status indicator lights represents wasted energy. As another example, a controller that controls the power consumption state of a network device may be communicatively coupled to a heating, ventilation, and air conditioning (HVAC) system. The HVAC system may be configured to raise or lower the room temperature during non-business hours for efficiency. Similarly, the controller may use the HVAC system's temperature setting as a trigger to transition to the low power consumption state 102 in the network device. As yet another example, a network device may be configured to operate in the low power consumption state 102 during non-business hours (e.g., 7:00 PM to 6:00 AM) and in the normal power consumption state 104 during business hours (e.g., 6:00 AM to 7:00 PM). The network device may be configured to observe holidays, weekends, or other special days or time periods when personnel are less likely to be present.

User-generated events may include events such as a door access, an account login, access to an administrative interface for a network device, or the connection of an electrostatic discharge (ESD) wristband. One or more of these events may be used as a triggering event to transition 108 from the low power consumption state 102 to the normal power consumption state 104. For example, a network device may be configured to transition 108 from a low power consumption state 102 to a normal power consumption state 104 when a cabinet door is opened or when a panel on a chassis is removed. A normally closed switch may be used on a door or a panel to detect when the switch contacts are separated, such as when the door is opened. After detecting the break in the circuit, a controller may transition 108 one or more status indicator lights on a network device to a normal power consumption state 104. Similarly, when a user connects an ESD wristband to a grounding unit, the LED status indicator lights on an associated network device may be transitioned 108 from a low power consumption state 102 to a normal power consumption state 104.

Another user-generated event that could trigger a similar transition 108 may include accessing an administrative interface to the network device. For example, when a user logs in to a computer terminal used to administer the network device one or more status indicator lights may become active or change operating state. In an example embodiment, when a user accesses the computer terminal remotely (e.g., remote desktop access or remote terminal services), the computer terminal or the network device may be configured to detect this type of access and differentiate from a local access, in which case the status indicator lights are not transitioned 108 to a normal power consumption state 104. This is logical because the user is not present or in proximity of the network device, thus the status indicator lights are not needed. Several mechanisms may be used to determine whether the user is present including, but not limited to, detecting a method of access, determining an Internet Protocol (IP) address used when accessing the terminal computer, or detecting the use of the attached keyboard, mouse, or other input device. Additionally, when a user accesses a control interface (e.g., administrative software or a router's management web-based user interface), if the access is from a local terminal—one that is proximate to the network device—then the network device's status indicator lights may be transitioned from a low power consumption state 102 to a normal power consumption state 104.

System-generated events may include events such as error events, alert events, or the like. A system error event may be related to a hardware component failure, a network link failure, or software component failure, in various examples. A system alert event may include events or conditions such as low available memory, abnormally intermittent or low network data throughput, link parity error, or other abnormal operation. A system error status or condition may be used to trigger normal LED operation to assist an operator in troubleshooting and diagnosing the source of the error status or condition. For example, in a room of network devices, each in a low power consumption state 102, when the network device with the error condition transitions to a normal power consumption state 104, it effectively "raises its hand" to be noticed by a technician or other human operator. Such a configuration would help the person find the unit with the problem quicker. In another example embodiment, the network device may be configurable so that only certain alerts or errors may trigger the transition 108. Combinations or permutations of these types of events may be used to transition 108 to the low power consumption state 104.

Although the discussion of FIG. 1 refers to a "low power consumption state" and a "normal power consumption state," it is understood that these power consumptions states may be viewed more generically, such as a first power consumption state and a second power consumption state. When viewed as such, the state diagram 100 illustrated in FIG. 1 may then be interpreted as illustrating how to transition from a first power consumption state to a second power consumption state.

Figure 2:
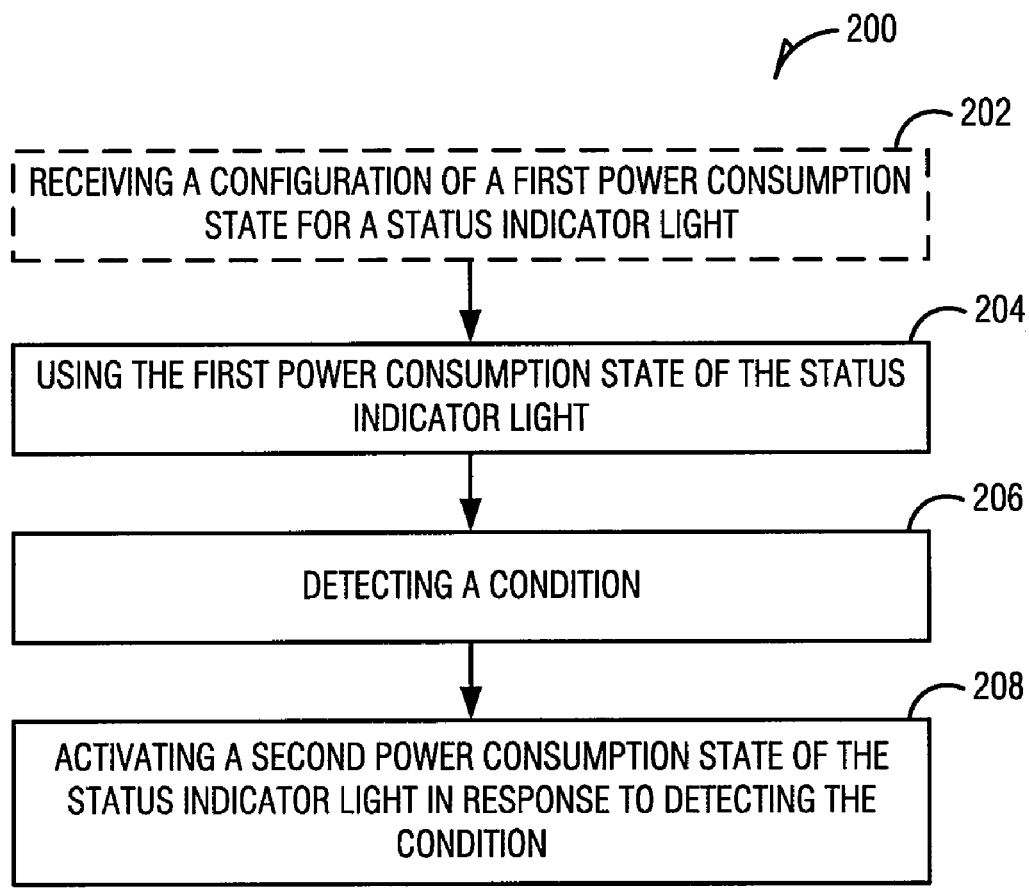
FIG. 2 is a flow diagram, in accordance with an example embodiment, illustrating a method of transitioning a status indicator light from a first power consumption state to a second power consumption state.

FIG. 2 is a flow diagram, in accordance with an example embodiment, illustrating a method 200 of transitioning a status indicator light in a network device from a first power consumption state to a second power consumption state. At 202, a configuration of a first power consumption state for a status indicator light is received. The configuration may define several modes, each of which may be manually or automatically enabled. For example, a "stealth" mode may be configured to disable all status indicator lights in a system, a "lite" mode may be configured to enable a single system status indicator light, and a "super lite" mode may pulse the single system status indicator light. The configuration may also be used to determine a timeout period, an expiration period, an active period, or other time-based event to trigger the transition from a first power consumption to a second power consumption state.

At 204, the first power consumption state of the status indicator light in the network device is used. In an example embodiment, the first power consumption state is used based on the configuration, which was optionally received at 202. The first power consumption state may be a low power consumption state in an example embodiment. The low power consumption state may be implemented using a reduced number of status indicator lights, using no status indicator lights, or pulsing a status indicator light, in various example embodiments. The pulsing may be configured to avoid blinking rates that could induce medical conditions. For example, by avoiding blinking in the 5 Hz to 30 Hz range, frequencies that are dangerous to those sensitive to certain epileptic conditions, the pulsing may reduce power consumption while also reducing the chance of producing medical side effects. In an example embodiment, a user is prohibited from configuring pulsating cycles in the 5 Hz to 30 Hz range.

As another example, the first power consumption state may be entered manually by an operator. For example, each mode described above, such as the "stealth" mode and the "lite" mode, may be enabled using keyboard function keys F1, F2, F3, etc. on the system's maintenance console, mapped to each power saving mode. The keyboard function keys may be programmed to activate or alter the mode without having the user log in to the terminal. As another example, the power saving modes may be toggled, cycled, or otherwise activated using one or more buttons on the front of the network device's chassis. Such buttons, or other controls, may be placed in other positions, such as at the rear of the chassis, or on the sides, top, or bottom of the chassis. In addition, redundant buttons may be used, for example, a mode button may be presented on the front and back of a chassis to allow for a user to control the mode when positioned in various physical locations around the chassis.

At 206, a condition is detected. In an example embodiment, detecting the condition may include detecting a change in an environmental condition. The environmental condition may include a change in ambient lighting or a change in the time of day, in various embodiments. To detect a change in an ambient lighting environmental condition, a network device may be equipped with a photosensitive detector. The network device may be located in a data center, closet, or other secured location where the primary lights may be switched off or dimmed when operators are not present. The primary lights may also be on a schedule, for example, to be illuminated automatically during regular business hours unless otherwise actuated, and then dimmed or turned off during off-hours. In this configuration, the status indicator lights on the network device may be disabled until the primary lights are detected as being fully illuminated.

In another example embodiment, the network device may be communicatively coupled to an environmental control system, such as a heating, ventilation, and air conditioning (HVAC) control, or a power and lighting management control. In this configuration, the status indicator lights may be enabled when the room lighting is activated, or when the room heating or air conditioning is activated, as such events may indicate that the room is being used, or will be used. Inversely, when the room lighting is deactivated or when the room heating or air conditioning is altered, the network device may be configured to deactivate one or more status indicator lights, or run the status indicator lights in a low power consumption state.

In another example embodiment, the change in the environmental condition may include a change in a time of day. For example, the status light indicators may be enabled during business hours and disabled during late night hours.

In another example embodiment, detecting the condition includes detecting a presence of an operator. Detecting the presence of an operator may be achieved using one or more mechanisms. For example, in many cases, the network device is enclosed in a cabinet using a rack mounting system. The cabinet door may be equipped with a switch to actuate a cabinet light or indicate an attempt at tampering. The network device may be coupled to the switch so that when the door is ajar, the status indicator lights on the network device are enabled. Similarly, a switch, such as a pressure switch or a contact switch may be used to detect when an access panel in a network appliance chassis is opened or removed. Status indicator lights may be enabled when the access panel is removed or opened.

Another mechanism to detect the presence of an operator includes the use of a motion detector. The motion detector may be incorporated into a room security system, for example. In various examples, the motion detector may include a passive infrared sensor to detect body heat, or an ultrasonic or microwave sensor to measure reflected signals off of moving objects. The motion detector may include the use of two or more of these types of motion-detection technologies. In an example embodiment, the motion detector is integrated into the network device. For example, a chassis may include a motion detector circuit to enable the LEDs on a display panel of the chassis and LEDs on each of the line cards inserted into the chassis. The display panel may be incorporated into the front, back, side, top or bottom of the chassis. In addition, the LEDs may be positioned in a redundant manner (e.g., on two or more sides of the chassis), so that a status may be represented by indicator lights that can be observed from multiple viewing angles. In addition, LEDs may be positioned on various surfaces of a chassis. For example, some frequently referred to status indicators may be placed on a readily-viewable surface, while other less-frequently referred to status indicators may be placed out of the way, such as behind a faceplate, on the side of the chassis, or the like. User interface design, chassis design, and other equipment parameters may limit the number or size of LEDs on a particular surface of the chassis, resulting in the use of multiple surfaces to present LEDs.

Another mechanism to detect the presence of an operator includes using a circuit to detect the use of an electrostatic discharge wrist strap and grounding station. For example, when an operator "plugs in" to the grounding station, the status light indicators for the equipment within nominal reach of that station may be enabled. In an example embodiment, a contact may be added to the ground jack to determine if the strap is connected and inform the management system to enable the indicators. This has a side benefit of encouraging grounding procedures and protocol.

Another mechanism to detect the presence of an operator includes detecting an access of a network appliance's management interface. For example, many routers include a web-based configuration interface. An operator may use a terminal computer to access the web-based configuration interface. The access of the management interface may indicate that an operator is also interested in viewing the status indicator lights to determine the operating state, error codes, or other function of the network device. As a further embodiment, the method 200 may be further modified to detect a network location from which the access originated (e.g., an Internet Protocol (IP) address). Using the network location, the method 200 may conditionally enable the status indicator lights. For example, when the access originates from a remote location (e.g., outside of the server room or data center), the status indicator lights are not enabled, but when the access originates from a local network location (e.g., on the same subnet as the server room or data center), the status indicator lights are enabled.

While some are described here, it is understood that other mechanisms and methods to detect the presence of an operator may be used without changing the scope of this description.

At 208, a second power consumption state is activated in response to detecting the condition. The second power consumption state may be a normal power mode in an example embodiment. In an example embodiment, to transition or activate a second power consumption state, where the power state is a lower power mode, the status indicator light is switched to an off state. In an example embodiment, when an error condition is detected, such as at block 206, status indicator lights are enabled for easier troubleshooting. Using such a configuration, when the system has a failure, alarm, or other problem, the system's status indicator lights may return to a normal power mode. Thus, with status indicator lights are operating in normal power mode, it may be easier to identify the malfunctioning system in a room where other systems continue to run in a lower power mode or a stealth mode.

In an example embodiment, the first power consumption state includes a reduced power mode. The reduced power mode may be referred to or considered a low power consumption state, as described above with respect to FIG. 1. The reduced power mode may include using a reduced number of status indicator lights, using no status indicator lights, or pulsing a status indicator light, in various embodiments.

Figure 3:
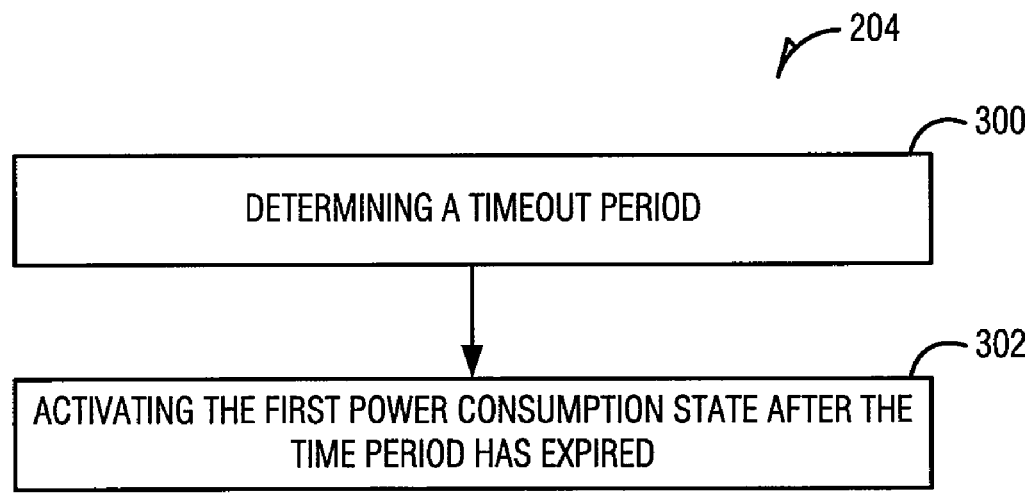
FIG. 3 is a flow diagram, in accordance with an example embodiment, illustrating a method of using the first power consumption state.

FIG. 3 is a flow diagram, in accordance with an example embodiment, illustrating a method 204 of using the first power consumption state. At 300, a timeout period is determined. In an example embodiment, the timeout period is defined by an ending date or time. In another example embodiment, the time period is defined by a length of time. For example, a period of inactivity (e.g., 15 minutes) may be used as the timeout period. In such a configuration, when no activity is detected for the timeout period, the method 204 transitions to 302.

At 302, the first power consumption state is activated after the timeout period has expired. In an example embodiment, the expiration of the timeout period acts as a triggering event to initiate the transition to the first power consumption state. In another example embodiment, the expiration of the timeout period may be used in conjunction with one or more other events to control the transition to the first power consumption state. For example, status indicator lights may be configured to transition to a low power state (first power consumption state) after a timeout period of inactivity has been observed and when the ambient room lights are off. To transition to the low power state, a reduced amount of power is supplied to the status indicator lights.

Figure 4:
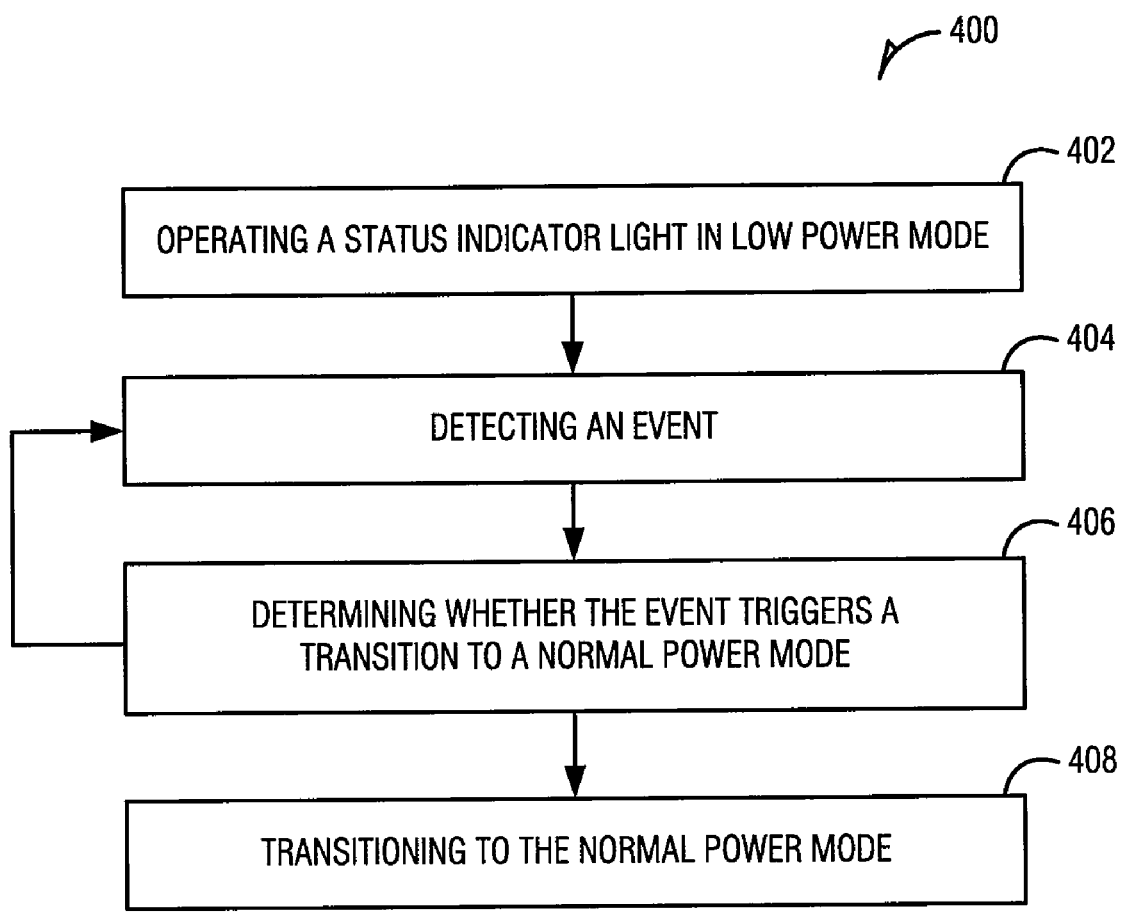
FIG. 4 is a flow diagram, in accordance with an example embodiment, illustrating a method of transitioning a status indicator light from a low power operating mode to a normal operating mode.

FIG. 4 is a flow diagram, in accordance with an example embodiment, illustrating a method 400 of transitioning a status indicator light from a low power operating mode to a normal operating mode. At 402, a status indicator light is operated in a low power mode. The low power mode may include using a limited number of status indicator lights selected from a plurality of status indicator lights, disabling all status indicator lights in a network device, or using a blinking or flashing status indicator light. In addition, combinations of low power modes may be used in a given network device. For example, a network device may include a chassis and one or more line cards. The chassis may include status indicator lights to provide information regarding the status of the power, cooling, network activity, or other operational details with respect to the chassis. In addition, each line card may include multiple status indicator lights, such as one or more lights for each network jack and one or more lights for the line card's operation. The chassis' status indicators lights may operate in one low power mode while a line card's status indicator lights may operate in a different low power mode. In a further example embodiment, each line card in a chassis may be configured to use a particular low power mode.

At 404, an event is detected. The event may include environmental events, user-initiated events, and system-initiated events. These events may include ambient lighting changes, HVAC events, door accesses, room accesses, security system events, and the other types of events described above.

At 406, it is determined whether the event triggers a transition to a normal power mode. In an example embodiment, two or more events are needed to trigger a transition to a normal power mode. For example, when an error event occurs, such as a network failure, it is useful to also determine whether a human operator is present before transitioning to the normal power mode. If no human operator is present, then from a power efficiency point of view, it may not make sense to make the transition. In such a configuration, one or more additional events may be detected before triggering the transition to the normal power mode. If the events needed to trigger the transition are not present, then the method 400 continues at 404, waiting for another event.

At 408, when the one or more events exist to trigger a transition to a normal power mode, the status indicator light is transitioned to the normal power mode.

Figure 5:
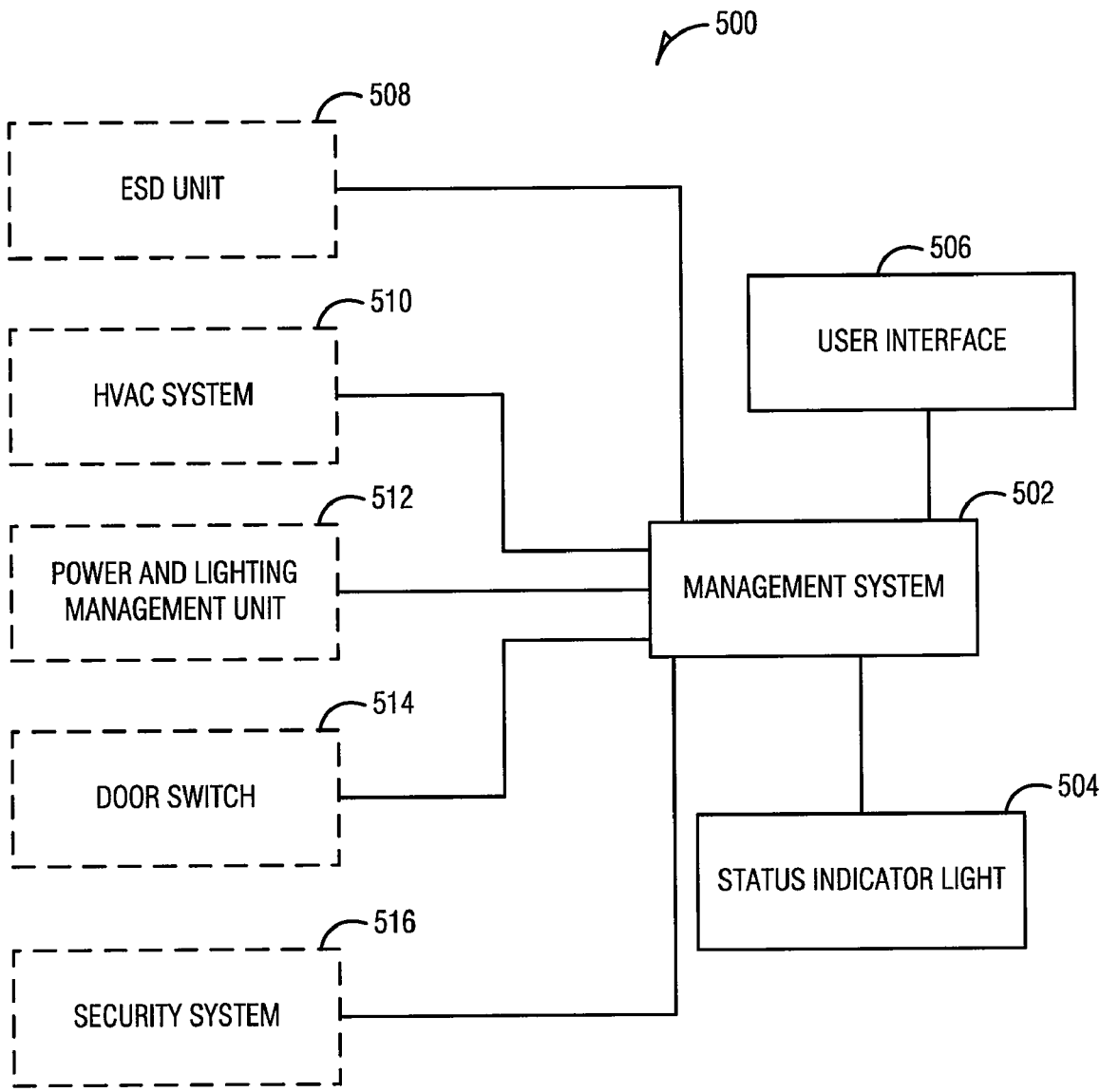
FIG. 5 is a block diagram of a system to control a power mode of a status indicator light, in accordance with an example embodiment.

FIG. 5 is a block diagram of a system 500 to control a power mode of a status indicator light, in accordance with an example embodiment. The system 500 includes a management system 502, a status indicator light 504, and a user interface 506. The system 500 also optionally includes an electrostatic discharge (ESD) unit 508, a heating, ventilation, and air conditioning (HVAC) system 510, a power and lighting management unit 512, a door switch 514, and a security system 516.

The management system 502 may include hardware components, such as memory, processors, secondary storage devices, network interface devices, and the like. In addition, the management system 502 may include software or firmware to control the processors and perform the methods and processes described herein. For example, the management system 502 may include one or more databases, files, or memory locations to store one or more configurations, where a configuration is used to provide how a status indicator light is transitioned from various states based on one or more events.

In an example embodiment, the management system 502 may be integrated with a network device. For example, the management system 502 may be a portion of the chassis used in a commercial or industrial network setting. In an example embodiment, the management system 502 is separate from, but communicatively coupled to, the network device. For example, a computer terminal used to manage one or more network devices in a data center may be configured as a management system 502 to control the operational power states of one or more status indicator lights 504.

As discussed above, the status indicator light 504 may be in one or more forms, such as an LED, LCD, PLED, or florescent light. Additional examples and descriptions are provided above. The status indicator light 504 is able to be configured to operate in a low power mode, such as a dimmed mode, a pulsing mode, or an inactive mode, and then to transition to a normal power mode after a triggering event is detected by the management system 502. Although only one status indicator light 504 is illustrated in FIG. 5, it is understood that a plurality of status indicator lights may be controlled by the management system 502 as described above.

The user interface 506 may be implemented in various ways, such as for example, a graphical user interface, a keyboard command, a switch or button on a network device, or any other mechanism that provides an interface for a user to control the management system 502. The user interface 506 may include a graphical user interface to manage one or more configurations, which may be stored in files, databases, or memory.

Additionally, the ESD unit 508 may be optionally communicatively coupled to the management system 502. The ESD unit 508 may include a switched circuit to detect when a user is connected with a grounding strap or other antistatic device. When the ESD unit 508 detects that a user is grounded, the management system 502 may transition the status indicator light 504 to a normal power state.

Additionally, the HVAC system 510 may be optionally communicatively coupled to the management system 502. The management system 502 may communicate with the HVAC system 510 to detect various environmental events, such as a change in ambient room temperature. Using an event detected by the HVAC system 510, the management system 502 may control the status indicator light 504 accordingly.

Additionally, the power and lighting management system 512 may be optionally communicatively coupled to the management system 502. The power and lighting management unit 512 may be used to programmatically control a room's lighting. One example includes a scheduled program to activate and deactivate a room's ambient lighting. When the schedule activates a room's lighting, the management system 502 may be notified of such an event and react by altering the power consumption state of the status indicator light 504.

Additionally, the door switch 514 may be optionally communicatively coupled to the management system 502. The door switch 514 may be configured to detect when a door is ajar. The management system 502 may then change the power state of the status indicator light 504 when the door is ajar, based on the door switch's 514 operation. Similarly, when the door switch 514 detects that the door is closed after being ajar, the management system 502 may transition the status indicator light 504 to a low power setting.

Additionally, the security system 516 may be optionally communicatively coupled to the management system 502. The security system 516 may include various devices such as a card reader, a door alarm, a motion detector, a fingerprint scanner, an infrared detector, a heat detector, a camera, a floor pressure switch, or other devices that are configurable to detect the presence of a human operator. When one or more devices in the security system 516 detect the presence of a person, the management system 502 may be notified and alter the state of status indicator light 504. Additionally, when the person is determined to be absent, such as by using a timeout period after the last detection of a presence, the management system 502 may be notified to transition the status indicator light 504 to a low power mode.

The ESD unit 508, HVAC system 510, power and lighting management unit 512, door switch 514, and security system 516 may be communicatively coupled to the management system 502, status indicator light 504, or user interface 506 using a wired connection, a wireless connection, or a combination of wired and wireless connections.

Figure 6:
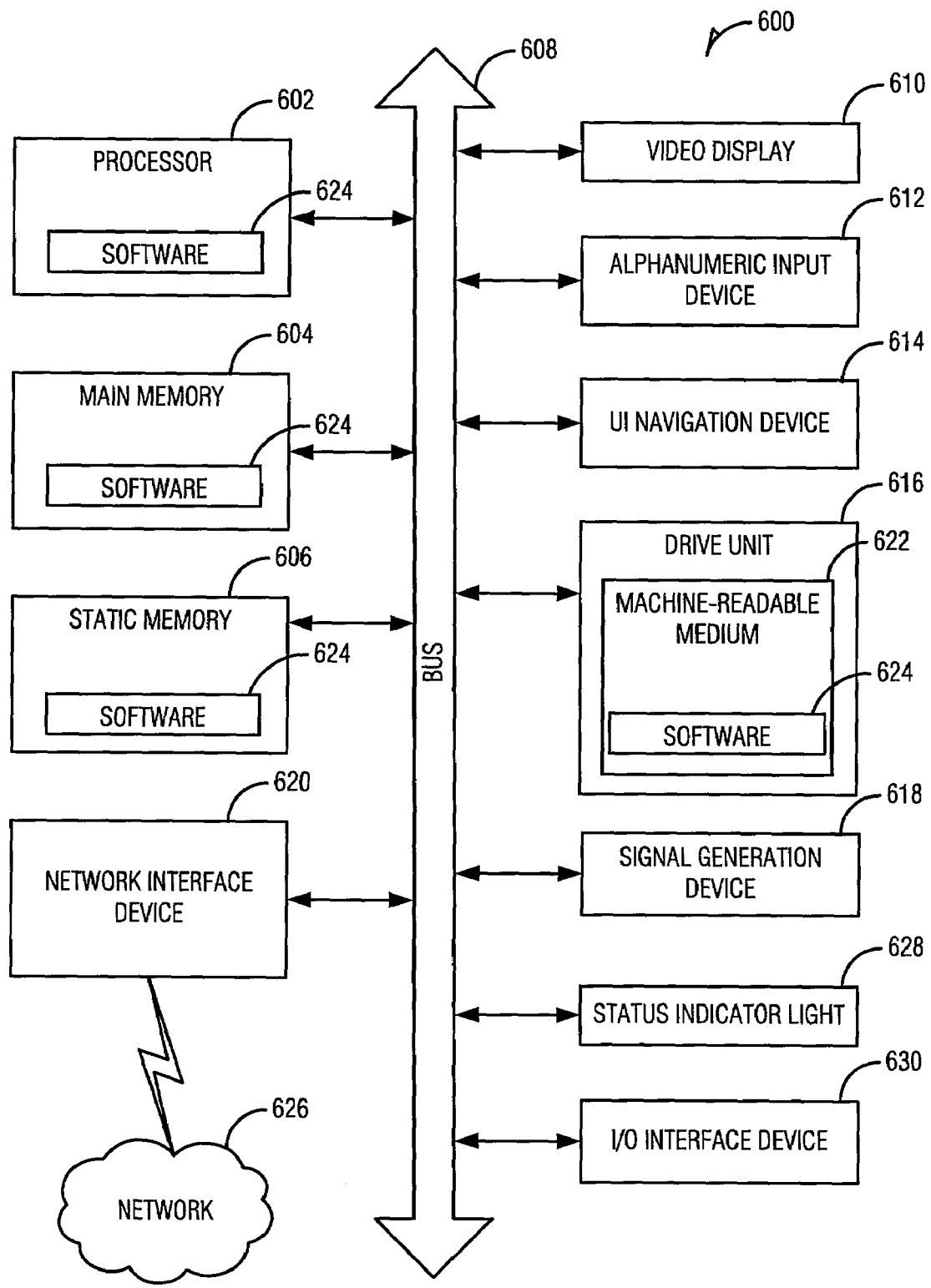
FIG. 6 is a block diagram of a machine, in accordance with an example embodiment, in the example form of computer system within which a set of instructions, for causing the machine to perform any one or more of the methodologies discussed herein, may be executed.

FIG. 6 is a simplified block diagram of a machine, in accordance with an example embodiment, in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine includes any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a plasma display, a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620. In addition, the computer system 600 includes a status indicator light 628 and an input/output interface device 630.

The status indicator light 628 may include one or more light sources that provide a status or condition of the computer system 600. As described above, the status indicator light 628 may comprise solid-state lighting, such as light-emitting diodes (LEDs), organic light-emitting diodes (OLED) or polymer light-emitting diodes (PLED). Other types of lighting or lamps may be used, including but not limited to incandescent light bulbs, fluorescent lighting, high-intensity discharge lighting, or plasma lamps. In addition, status indicator lights may include a display, such as a LED display or liquid crystal display (LCD).

The input/output interface device 630 may be configured to communicate with one or more external systems, sensors, devices, or the like. External systems may include, but are not limited to, an ambient lighting control system, an HVAC system, or a security system. Sensors may include, but are not limited to, cameras, photosensitive sensors, motion detectors, weight detectors, keycard systems, or electrostatic discharge units. Additional devices may include a rack or cabinet control computer terminal, a door switch, an access paneling switch, a timer, or a clock.

The disk drive unit 616 may include machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, where the main memory 604 and the processor 602 also constitute machine-readable, tangible media.

Software 624 may further be transmitted or received over network 626 via network interface device 620 utilizing any one of a number of well-known transfer protocols (e.g., HTTP).

While machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. This disclosure is intended to cover any and all adaptations or variations of various embodiments. Combinations of the above embodiments, and other embodiments not specifically described herein, will be apparent to those of skill in the art upon reviewing the above description. For example, one functional, computational, or hardware module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the appended claims, the terms "including" and "in which" are used as the plain-English equivalents of the respective terms "comprising" and "wherein," respectively. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or a particular ordering on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for managing a power consumption state of a status indicator light in a network device, comprising:
   entering a first power consumption state, within the network device, upon boot-up, the first power consumption state being a reduced power mode of the status indicator light;
   using the first power consumption state of the status indicator light in the network device;
   detecting, on circuitry within the network device, a first condition;
   detecting, on circuitry within the network device, presence of an operator including receiving an indication, from a grounding unit, of a grounding connection of an electrostatic discharge (ESD) device; and
   activating, on the network device, a second power consumption state of the status indicator light in response to detecting the condition and detecting operator presence.

2. The method of claim 1, further comprising receiving a configuration of the first power consumption state for the status indicator light in the network device to modify the first power consumption state to a modified power consumption state, and wherein using the first power consumption state comprises using the modified power consumption state based on the configuration.

3. The method of claim 1, wherein using the first power consumption state comprises:
   determining a timeout period to delay entering the power consumption state upon boot-up; and
   activating the first power consumption state after the timeout period has expired.

4. The method of claim 1, wherein detecting the condition comprises detecting a change in an environmental condition.

5. The method of claim 4, wherein detecting the change in the environmental condition includes at least one of: a change in ambient lighting or a change in a time of day.

6. The method of claim 1, wherein detecting the presence of the operator uses at least one of: motion detection or door switch actuation, in addition to the electrostatic discharge grounding connection detection.

7. The method of claim 1, wherein detecting the condition comprises detecting an error condition and wherein activating the second power consumption state includes activating a normal power mode.

8. The method of claim 1, wherein the reduced power mode includes at least one of: using a reduced number of status indicator lights, using no status indicator lights, or pulsing a status indicator light.

9. The method of claim 1, wherein activating the second power consumption state comprises switching the status indicator light to a normal power mode state.

10. An apparatus for managing a power consumption state of a status indicator light in a network device, the apparatus comprising:
   a memory including a first power consumption state configuration;

a processor coupled to the memory, the processor configured to read the first power consumption state configuration upon boot-up;

the status light operating, from boot-up of the network device, in a first power consumption state;

means for detecting a condition;

means for detecting presence of an operator including detecting a grounding connection of an electrostatic discharge (ESD) device; and the processor further configured to activate a second power consumption state of the status indicator light in response to detecting the condition and detecting operator presence.

11. An apparatus comprising:

a processor;

a status indicator light in communication with the processor; and a memory in communication with the processor, the memory comprising instructions executable by the processor, which when executed, the processor being operable to:

read from the memory upon boot-up a configuration of a first power consumption state for the status indicator light, the first power consumption state being a reduced power mode of the status indicator light;

activate, upon boot-up, the first power consumption state using the configuration;

detect a condition;

detect presence of an operator including detecting a grounding connection of an electrostatic discharge (ESD) unit; and activate a second power consumption state for the status indicator light response to detecting the condition and detecting operator presence.

12. The apparatus of claim 11, further comprising instructions executable by the processor, which when executed, the processor being operable to:

determine a timeout period after initial boot-up of the apparatus; and activate the first power consumption state after the timeout period has expired.

13. The apparatus of claim 11, wherein the instructions used to detect the condition further comprise instructions executable by the processor, which when executed, the processor being operable to detect a change in an environmental condition.

14. The apparatus of claim 13, wherein the change in the environmental condition includes at least one of a change in ambient lighting or a change in a time of day.

15. The apparatus of claim 11, wherein the instructions used to detect the presence of the operator include instructions to receive input from at least one of: a motion detector or a door switch, in addition to the connection to an electrostatic discharge unit.

16. The apparatus of claim 11, wherein the instructions used to detect the condition further comprise instructions executable by the processor, which when executed, the processor being operable to detect an error condition and wherein the instructions used to activate the second power consumption state further comprise instructions executable by the processor, which when executed, the processor being operable to activate a normal power mode.

17. The apparatus of claim 11, wherein the low power consumption state includes at least one of using a reduced number of status indicator lights, using no status indicator lights, or pulsing a status indicator light.

18. The apparatus of claim 17, wherein the pulsing the status indicator light includes configuring the status indicator light to pulse at a frequency that reduces the chances of causing photosensitive seizures.

* * * * *

UNITED STATES PATENT AND TRADEMARK OFFICE
CERTIFICATE OF CORRECTION

| | | |
|---|---|---|
| PATENT NO. | : 8,242,926 B2 | Page 1 of 1 |
| APPLICATION NO. | : 12/347950 | |
| DATED | : August 14, 2012 | |
| INVENTOR(S) | : Byers et al. | |

It is certified that error appears in the above-identified patent and that said Letters Patent is hereby corrected as shown below:

In column 14, line 39, in Claim 3 delete "the power" and insert --the first power--, therefor In column 15, line 32, in Claim 11 delete "light response" and insert --light in response--, therefor In column 16, line 11, in Claim 14 after "of", insert --:--, therefor In column 16, line 27, in Claim 17 after "of", insert --:--, therefor Signed and Sealed this
Sixth Day of November, 2012

David J. Kappos
*Director of the United States Patent and Trademark Office*